(12) United States Patent
Nishimura et al.

(10) Patent No.: US 6,920,013 B2
(45) Date of Patent: Jul. 19, 2005

(54) DISK DRIVE SPINDLE MOTOR WITH RADIAL INWARD THRUST AREA ANNULAR PROTRUDING PORTION AND BEARING MEMBER COMMUNICATING PASSAGE

(75) Inventors: Hideki Nishimura, Kyoto (JP); Yoshioto Oku, Kyoto (JP); Yasuhiro Mori, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/605,941

(22) Filed: Nov. 7, 2003

(65) Prior Publication Data

US 2005/0099722 A1 May 12, 2005

(51) Int. Cl.[7] ............................ G11B 17/02; H02K 7/08
(52) U.S. Cl. ...................................... 360/99.08; 310/90
(58) Field of Search ........................... 360/99.08, 98.07; 310/90, 67 R

(56) References Cited

U.S. PATENT DOCUMENTS 4,998,033 A    3/1991  Hisabe et al.
5,273,368 A   12/1993  Asada et al.
5,659,445 A    8/1997  Yoshida et al.
6,456,458 B1   9/2002  Ichiyama
2003/0230943 A1 * 12/2003 Tokunaga et al. ............. 310/90

* cited by examiner

*Primary Examiner*—Craig A. Renner
(74) *Attorney, Agent, or Firm*—Shinjyu Global IP

(57) ABSTRACT

In a spindle motor utilizing dynamic-pressure bearings having a full-fill structure, a bearing configuration that balances and sustains at or above atmospheric pressure the internal pressure of the bearing oil. Thrust and radial bearing sections are configured within oil-filled bearing clearances in between the rotor, the shaft, and a shaft-encompassing hollow bearing member. A communicating passage one end of which opens on, radially inwardly along, the thrust bearing section is formed in the bearing member. Either axial ends of the bearing clearance in between the bearing member and shaft communicate through the passage. The communicating passage enables the oil to redistribute itself within the bearing clearances. Pressure difference between the axial upper and lower ends of the oil retained in between the bearing member and the shaft is compensated through the communicating passage, preventing incidents of negative pressure within the oil and of over-lift on the rotor.

8 Claims, 6 Drawing Sheets

DISK DRIVE SPINDLE MOTOR WITH RADIAL INWARD THRUST AREA ANNULAR PROTRUDING PORTION AND BEARING MEMBER COMMUNICATING PASSAGE

BACKGROUND OF INVENTION

1. Technical Field

The present invention relates to spindle motors employing dynamic-pressure bearings in which oil is the working fluid, and to disk drives equipped with such spindle motors. The invention relates in particular to miniature, low-profile spindle motors that drive recording disk 2.5 inches and under, and to disk-drives equipped with such spindle motors.

2. Description of the Related Art

Dynamic-pressure bearings in which the fluid pressure of a lubricating fluid such as oil interposed in between the shaft and the sleeve is exploited in order to support the two letting the one rotate against the other have been proposed to date as bearings for spindle motors employed in disk drives that drive hard disk and like recording disks.

FIG. 1 depicts one example of a spindle motor employing dynamic-pressure bearings. This spindle motor in which conventional dynamic pressure bearings are employed is configured with a pair of axially separated radial bearing sections d, d in between the circumferential surface of the motor shaft b, which is integral with the rotor a, and the inner peripheral surface of the motor sleeve c, into which the shaft b is rotatively inserted. Likewise, a pair of thrust bearing sections g, g is configured in between the upper surface of a disk-shaped thrust plate e that projects radially outward from the circumferential surface of the shaft b on one of its ends, and the flat surface of a step formed in the sleeve c, as well as in between the lower surface of the thrust plate e and a thrust bush f that closes off one of the openings in the sleeve c.

A series of micro-gaps is formed in between the shaft b and thrust plate e, and the sleeve c and thrust bush f, and oil as a lubricating fluid is retained continuously without interruption within these micro-gaps. The oil retained in the micro-gaps is exposed to the air only within a taperseal area h provided at the upper-end opening (the other opening in the sleeve c) of the gap formed in between the circumferential surface of the shaft b and the inner peripheral surface of the sleeve c. (This sort of oil-retaining structure will be denoted a "full-fill structure" hereinafter.) The dynamic-pressure bearings further include herring-bone grooves d1, d1 and g1, g1 that are linked pairs of spiral striations formed in the radial bearing sections d, d and thrust bearing sections g, g. In response to the rotor a rotating the grooves d1, d1 and g1, g1 generate maximum dynamic pressure in the bearing-section central areas where the spiral striation links are located, thereby supporting loads that act on the rotor a.

With dynamic-pressure bearings in a full-fill structure, when the rotor a begins rotating, pumping by the dynamic-pressure-generating grooves d1, d1 and g1, g1 acts to draw oil in toward the center areas of each of the radial bearing sections d, d and thrust bearing sections g, g, peaking the fluid dynamic pressure in the bearing center areas; but the downside of this is that along the bearing edge areas the oil internal pressure drops. In particular, in response to the pumping by the dynamic-pressure-generating grooves d1, d1 and g1, g1 the internal pressure of the oil drops-falling below atmospheric pressure and eventually becoming negative-in the region between the pair of radial bearing sections d, d among where oil is retained between the circumferential surface of the shaft b and the inner peripheral surface of the sleeve c, and in the region adjacent the outer periphery of the thrust plate e located in between the thrust bearings g, g among where oil is retained surrounding the thrust plate e.

If negative pressure within the oil has been brought about, during such operations as when the bearings are being charged with oil for example, air will dissolve into the oil and appear in the form of bubbles. Sooner or later the bubbles will swell in volume due to elevations in temperature, causing the oil to exude outside the bearings. This leakage impairs the endurance and reliability of the spindle motor. Negative pressure occurring within the oil can also lead to the dynamic-pressure-generating grooves coming into contact with air bubbles, which invites vibration incidents and deterioration due to NRRO (non-repeatable run-out). Such consequences impair the rotational precision of the spindle motor.

If because some factor is off in the manufacturing process the radial clearance dimension of the micro-gap formed in between the inner peripheral surface of the sleeve and the circumferential surface of the shaft is formed wider at the lower end axially than at the upper end, then an imbalance in the pumping by the dynamic-pressure-generating grooves d1, d1 in the radial bearing sections d, d will arise, and in the oil retained in between the inner peripheral surface of the sleeve and the circumferential surface of the shaft the pressure on the upper end axially will become higher than the pressure on the lower end axially. Pressure is consequently transmitted from along the upper axial end to along the lower axial end of the microgap formed in between the inner peripheral surface of the sleeve and the circumferential surface of the shaft, raising higher than is necessary the internal pressure of the oil retained in between the thrust-plate undersurface and the thrust bush and producing over-lift on the rotor, lifting it more than the predetermined amount.

Incidents of over-lift on the rotor give rise to frictional wear on the thrust plate and the sleeve by bringing them into contact; frictional wear is one factor to blame for spoiling bearing endurance and reliability. What is more, in the case of spindle motors for driving hard disk, as a consequence of the scaling-up of hard disk capacity, hard-disk recording faces and magnetic heads are being arranged extremely close to each other, and thus over-lift on the rotor brings the hard disk and magnetic heads into contact, leading to disk crash.

In addition, when the rotor a begins rotating, pumping by the dynamic-pressure-generating grooves d1, d1 and g1, g1 acts to draw oil in toward the center areas of each of the radial bearing sections d, d and thrust bearing sections g, g, peaking the fluid dynamic pressure in the bearing center areas. Nevertheless, when the motor rotates at low speed, the load bearing pressure generated by the bearing sections are insufficient. In particular, low thrust load bearing pressure gives rise to frictional wear on the thrust plate e and the sleeve c or the thrust bush f by bringing them into contact; frictional wear is one factor to blame for spoiling bearing endurance and reliability.

Further, with the advent of the application of disk drives in miniature devices such as portable information terminals, demands are on the rise to make the spindle motors used in the disk drives even miniature and slimmer. If the axial height and diameter of the motor is reduced, the space for containing stator and rotor magnet is limited and then sufficient driving force or torque cannot be obtained. As the result, when the motor starts to rotate, the driving force or torque of the motor becomes lower than the frictional torque and/or loss caused by being in contact with the thrust plate e and the sleeve c or the thrust bush f and the motor can not rotate.

SUMMARY OF INVENTION

An object of the present invention is to realize a miniature, low-profile spindle motor that nonetheless provides for stabilized rotation.

Another object of the invention is to realize a spindle motor capable of sustaining at or above atmospheric pressure the internal pressure of the oil retained within the bearing clearances, and preventing air bubbles from being generated within the oil.

Still another object is to realize a spindle motor that enables the internal pressure of the oil retained within the bearing clearances to balance.

A different object of the present invention is to realize a spindle motor in which while miniaturization and slimming in profile are practicable, air bubbles arising due to negative-pressure, and incidents of over-lift on the rotor can be prevented, and incidents of knocking and grazing in the bearing sections can be controlled.

Yet another object of the present invention is to realize a miniature, low-profile spindle motor that nonetheless provides for stabilized start to rotate.

Still another object of the invention is to realize a spindle motor capable of reducing frictional torque and/or loss in the bearing sections.

The present invention is also the realization of a low-profile, low-cost disk drive providing for stabilized starting the rotation of recording disk notwithstanding the spindle motor is miniature and slimed.

Yet another object of the invention is to realize a disk drive of superior reliability and endurance.

In one example of a spindle motor according to the invention, the rotor has a circular flat face extending radially outward from the circumferential surface of the shaft, and a series of bearing clearances filled with oil is formed in between the flat face of the rotor, and the shaft and a hollow cylindrical bearing member having a bearing hole into which the shaft is rotatively inserted. A thrust bearing section is formed in between the end face at an opening in the bearing member, and the flat face of the rotor; and a radial bearing section is formed in between the inner peripheral surface of the bearing hole and the circumferential surface of the shaft. In addition, a communicating passage that serves to balance the pressure within the bearing clearances is formed in the bearing member. One end of the communicating passage opens on the thrust bearing section radially inwardly therein, and either axial ends of a bearing clearance formed in between the inner peripheral surface of the bearing hole and the circumferential surface of the shaft communicate through the passage. And an annular protruding portion is formed on at least one of the end face of the bearing member and the flat face of the rotor at radially inward portion of the thrust bearing section.

This configuration makes it possible to prevent incidents of negative pressure and over-lift in a spindle motor utilizing dynamic-pressure bearings having a full-fill structure.

The fact either axial end of the bearing clearance formed in between the inner peripheral surface of the bearing hole and the circumferential surface of the shaft communicate by means of the passage enables the oil to redistribute itself within the bearing clearances. Thus even in cases in which a pressure difference has occurred between the axial upper and lower ends of the oil retained in between the inner peripheral surface of the bearing member and the circumferential surface of the shaft, arising from dimensional margin of error in the dynamic-pressure-generating grooves provided in the radial bearing section, or because some factor is off in processing the inner peripheral surface of the bearing hole or the circumferential surface of the shaft, the pressure difference is compensated through the communicating passage, preventing incidents of negative pressure within the oil and of over-lift on the rotor.

Likewise, the fact that the compensation of the oil internal pressure takes place within a region that pressure-wise is sealed by the thrust bearing section cushions the drop in oil pressure that occurs when the motor is decelerating, which makes it possible to control knocking and grazing in the bearing sections, meaning that motor reliability and endurance are sustained to a high degree.

In addition, since the annular protrusion portion is positioned at radially inward portion of the thrust bearing section, the frictional torque and/or loss caused by being in contact with the rotor and the sleeve will accordingly be reduced. It is therefore, the starting of the motor is accurately performed, notwithstanding the spindle motor is miniature and slimed.

In one example of a disk drive according to the present invention is a recording-disk-spinning spindle motor in which the rotor has a circular flat face extending radially outward from the circumferential surface of the shaft, and a series of bearing clearances filled with oil is formed in between the flat face of the rotor, and the shaft and a hollow cylindrical bearing member having a bearing hole into which the shaft is rotatively inserted. A thrust bearing section is formed in between the end face at an opening in the bearing member, and the flat face of the rotor; and a radial bearing section is formed in between the inner peripheral surface of the bearing hole and the circumferential surface of the shaft. In addition, a communicating passage that serves to balance the pressure within the bearing clearances is formed in the bearing member. One end of the communicating passage opens on the thrust bearing section radially inwardly therein, and either axial end of the bearing clearance formed in between the inner peripheral surface of the bearing hole and the circumferential surface of the shaft communicate through the passage. And an annular protruding portion is formed on at least one of the end face of the bearing member and the flat face of the rotor at radially inward portion of the thrust bearing section.

From the following detailed description in conjunction with the accompanying drawings, the foregoing and other objects, features, aspects and advantages of the present invention will become readily apparent to those skilled in the art.

DETAILED DESCRIPTION

Embodiments according to the present invention of a spindle motor and of a disk drive equipped therewith will be explained in the following with reference to FIGS. 2 through 6, but the present invention is not limited to the embodiments set forth below. It will be appreciated that although for the sake of convenience in the description of the present embodiments, "upper/lower, above/below, etc." are in the vertical direction of the drawings, the orientation of the spindle motor in its actually installed state is not limited.

(1) Configuration of Spindle Motor

Figure 1:
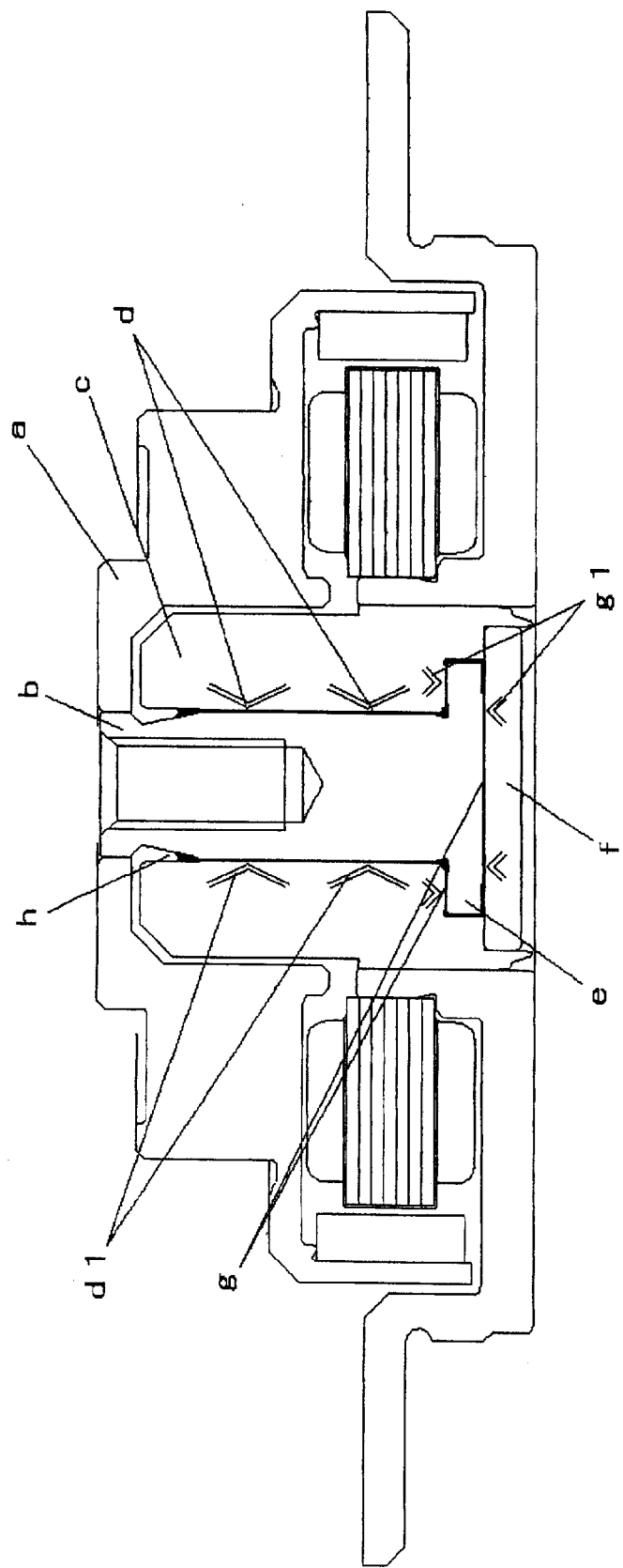
FIG. 1 is a sectional view diagramming the configurational outline of a conventional spindle motor.
Figure 2:
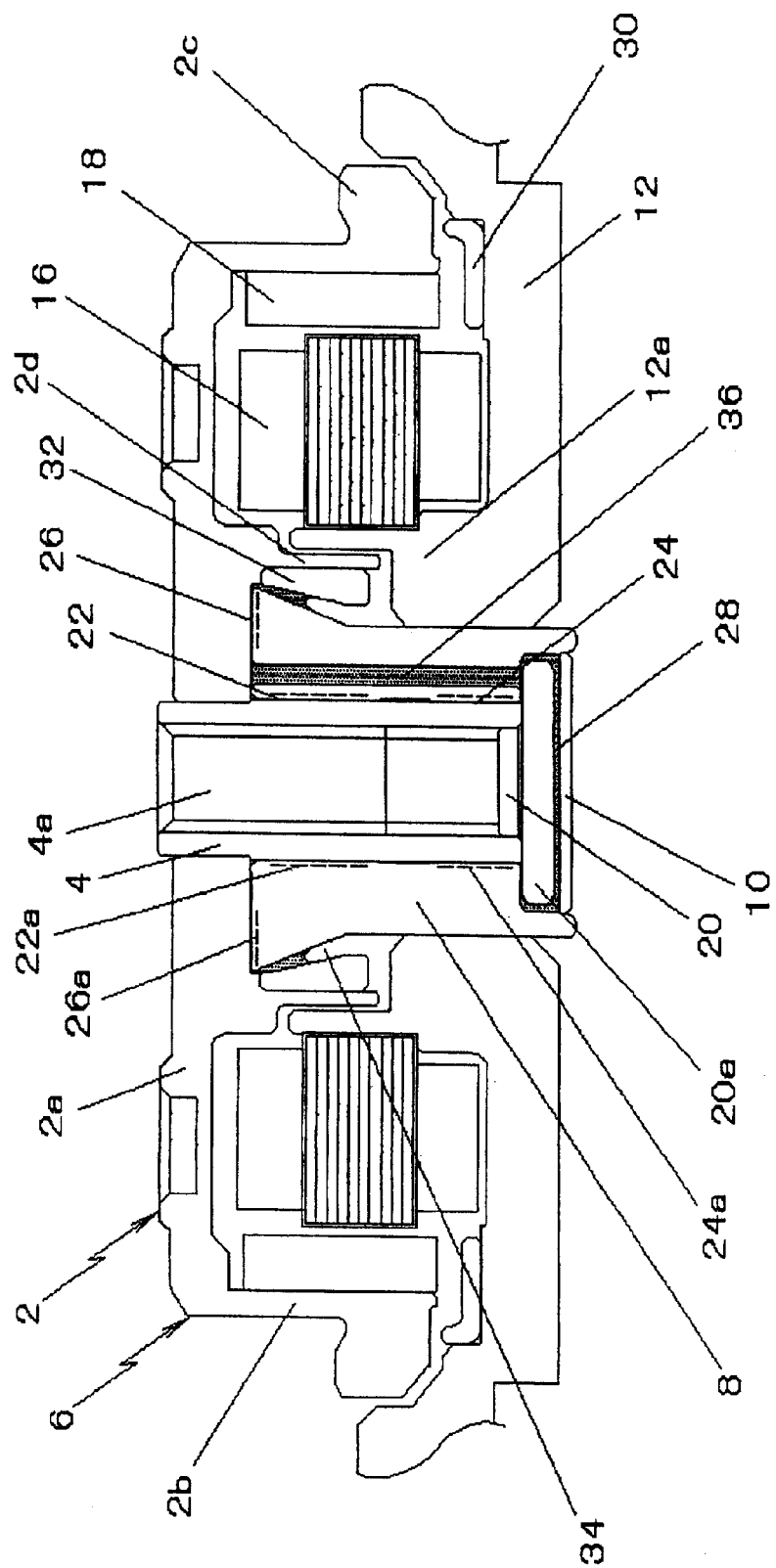
FIG. 2 is a sectional view diagramming the configurational outline of a spindle motor having to do with a first embodiment of the present invention.

The spindle motor graphically represented in FIG. 2 is furnished with: a rotor 6 constituted from a rotor hub 2 which is made up of an approximately disk-shaped upper wall portion 2a (top plate) and a cylindrical peripheral wall portion 2b (cylindrical wall) depending downward from the outer rim of the upper wall portion 2a- and from a shaft 4 one end portion of which perimetrically is fixedly fitted into the central portion of the upper wall portion 2a of the rotor hub 2; a hollow cylindrical sleeve 8 rotatively supporting the shaft 4; a cover member 10 that closes over the lower opening portion of the sleeve and opposes the end face of the shaft 4 along its free end; and a bracket 12 formed unitarily with a cylindrical portion 12a into which the sleeve 8 is fitted. A stator 16 having a plurality of teeth is provided on an outer peripheral surface of the cylindrical portion 12a of the bracket 12, wherein the rotor magnet 18 radially opposes the stator 16 across a gap. Likewise, a flange-shaped disk-carrying portion 2c by which recording disk such as a hard disk (illustrated as disk plates 53 in FIG. 6) are carried is provided on the outer peripheral surface of the peripheral wall portion 2b of the rotor hub 2.

A through-hole 4a is formed in the shaft 4, penetrating it coaxially with its rotational center axis. Male threads (not illustrated) for fastening a clamp (not illustrated) in order to retain the recording disk on the disk-carrying portion 2c of the rotor hub 2 are clinched in the opening of the through-hole 4a on the rotor-hub 2 side. Meanwhile, a pin member 20 having a flange-shaped portion 20a diametrically larger than the shaft 4 outer diameter is fitted in the opening of the through-hole 4a on the cover-member 10 side. A bored-out section in the sleeve 8 is provided in its cover-member 10 end; and by engagement of the face therein that is oriented orthogonal to the rotational center axis and that stretches from the inner-peripheral surface of the sleeve 8 to the circumferential wall of the bored-out section, with the matching face, oriented orthogonal to the rotational center axis, of the flange portion 20a of the pin-member 20, a retainer that holds the stator 6 in place is configured.

An unbroken series of micro-gaps is formed in between the upper-end face of the sleeve 8 and the undersurface of the upper wall portion 2a of the rotor hub 2; and continuing from the upper wall portion 2a of the rotor hub 2 in between the outer circumferential surface of the shaft 4 and the inner circumferential surface of the sleeve 8; and continuous therewith, in between the bored-out section of the sleeve 8 and the flange portion 20a of the pin-member 20; and in between the inner face of the cover member 10 and, axially opposing it, the end face of the pin member 20 (each of these gaps/clearances, as well as clearances formed within a communicating hole 36 that will be described shortly, taken together will be denoted "bearing clearances" hereinafter). Oil is retain continuously without interruption within these consecutive clearances, wherein a full-fill structure is configured.

Herringbone grooves 22a (indicated by a broken line in FIG. 2) that induce hydrodynamic pressure in the oil when the rotor 6 spins are formed on the inner circumferential surface of the sleeve 8 alongside its upper-end face (alongside the rotor-hub 2 end). The herringbone grooves 22a are constituted by linked pairs of spiral striations inclining into each other from mutually opposing directions with respect to the rotary direction. An upper radial bearing section 22 is thus configured between the inner circumferential surface of the sleeve 8 where the grooves. 22a are formed and the outer circumferential surface of the shaft 4. Likewise, herringbone grooves 24a (indicated by a broken line in FIG. 2) that induce hydrodynamic pressure in the oil when the rotor 6 spins are formed on the inner circumferential surface of the sleeve 8 alongside the free-end portion of the shaft 4 (alongside the cover member 10). The herringbone grooves 24a are constituted by linked pairs of spiral striations inclining into each other from mutually opposing directions with respect to the rotary direction. A lower radial bearing section 24 is thus configured between the inner circumferential surface of the sleeve 8 where the grooves 24a are formed and the outer circumferential surface of the shaft 4.

In this configuration, of the spiral striations that constitute the herringbone grooves 22a formed in the upper radial bearing section 22, those spiral striations located alongside the upper end of the sleeve 8 are established to be longer in axial dimension than the spiral striations located alongside the lower radial bearing section 24. Likewise, of the spiral striations that constitute the herringbone grooves 24a formed in the lower radial bearing section 24, those spiral striations located alongside the lower end of the sleeve 8 are established to be longer in axial dimension than the spiral striations located alongside the upper radial bearing section 22. This configuration makes it so that maximum pressure in the upper and lower radial bearing sections 22 and 24 appears in loci that are biased toward the midsections of the upper and lower radial bearing sections 22 and 24 where the bends in which the spiral striations link are located, rather than toward the longitudinal centers of the bearing sections.

In addition, pump-in spiral grooves 26a (indicated by a broken line in FIG. 2) that induce radially inward-heading (toward the shaft 4) pressure in the oil when the rotor 6 spins are formed on the sleeve 8 upper-end face (face axially opposing the upper wall portion 2a). A thrust bearing section 26 is thus configured between the upper-end face of the sleeve 8 and the undersurface of the upper wall portion 2a of the rotor-hub 2. Furthermore, a hydrostatic bearing 28 exploiting the oil internal pressure heightened, as will later be described in detail, by the spiral grooves 26a of the thrust bearing section 26 is constituted in between the inner face of the cover member 10 and, axially opposing it, the end face of the pin member 20.

How the bearings configured as noted above function for journal support will be described.

Pumping force from the herringbone grooves 22a and 24a in the upper and lower radial bearing sections 22, 24 rises attendant on rotation of the rotor 6, producing fluid dynamic pressure. As far as pressure distribution in the upper and lower radial hydrodynamic bearings 22, 24 is concerned, pressure rises abruptly from alongside either ends of the herringbone grooves 22a, 24a and becomes maximal at the bends in which the spiral striations link. The fluid dynamic pressure generated in the upper and lower radial hydrodynamic bearings 22, 24, is utilized to journal-support the shaft 4 axially along its upper/lower ends, and plays a role in centering the shaft 4 and restoring it from deviations.

Radially inward-heading pressure is induced in the oil in the thrust bearing section 26 by the pump-in spiral grooves 26a attendant on rotation of the rotor 6. The oil is stimulated to flow by the radially inward-heading pressure, raising the oil internal pressure and generating fluid dynamic pressure acting in a lifting direction on the rotor 6. It should be understood that the fluid dynamic pressure induced in the thrust bearing section 26 does not rise abruptly as is the case with the upper and lower radial hydrodynamic bearings 22, 24; rather, at maximum it is at a level exceeding atmospheric pressure to a certain degree. The oil retained-in continuity with the upper wall portion 2a of the rotor hub 2 in between the outer circumferential surface of the shaft 4 and the inner circumferential surface of the sleeve 8, and continuous therewith, in between the end face of the shaft 4 and the inner face of the cover member 10 is pressure-wise brought into an essentially sealed state by the pressure generated in the thrust bearing section 26. Thus, the fact that the internal pressure of the oil retained in the hydrostatic bearing 28 constituted in between the end face of the shaft 4 along its free end and the inner face of the cover member 10 will be pressure equal to the oil internal pressure that due to the fluid dynamic pressure induced in the thrust bearing section 26 has been raised, means that cooperation by the thrust bearing 26 and the hydrostatic bearing 28 enables sufficient lift to be put on the rotor 6.

As is diagrammatically shown in FIG. 2 an annular thrust yoke 30 formed from a ferromagnetic material is disposed in a position on the bracket 12 opposing the rotor magnet 18, generating magnetically attractive force in the axial direction in between the thrust yoke 30 and the rotor magnet 18 that balances with the rotor 6 lifting pressure produced in the thrust bearing section 26 and the hydrostatic bearing 28. This balancing stabilizes the thrust-direction support of the rotor 6, and holds in check occurrence of excessive lift that would raise the rotor 6 higher than is necessary. This sort of magnetic urging on the rotor 6 can be effectuated also by, for example, displacing the magnetic centers of the rotor magnet 18 and the stator 16 axially from each other.

With the herringbone grooves 22a provided in the upper radial bearing section 22 being axially asymmetrical in form, dynamic pressure that presses downward on the oil is generated; meanwhile with the herringbone grooves 24a provided in the lower radial bearing section 24 being axially asymmetrical in form, dynamic pressure that presses upward on the oil is generated. Thus, at the same time rotation of the rotor 6 is supported by the upper and lower radial bearing sections 22 and 24, the pressure in the region between the upper radial bearing section 22 and the lower radial bearing section 24 is kept at positive pressure-atmospheric pressure or greater; negative pressure is prevented from arising.

The outer circumferential surface of the sleeve 8, amounting to an outer circumferential side of the upper radial bearing section 22, is formed into an inclined face such that the sleeve 8 outer diameter contracts in the direction heading toward the bracket 12, i.e., with further separation from the sleeve 8 upper-end face, which is a component of the thrust bearing section 26. In this same part of the spindle motor, an annular projection 2d (cylindrical wall), whose inner circumferential surface is at a slightly larger diameter than the outer diameter of the sleeve 8 at its upper-end face, is provided on the undersurface of upper wall portion 2a of the rotor hub 2. A ring-shaped member 32 is affixed—by for example adhering or pressure-fitting means—to the inner circumferential surface of the annular projection 2d and is formed with an inclined face, such that the inner peripheral surface of the ring-shaped member 32 is out of contact with and radially opposes to the inclined face of the sleeve 8, and such that the inter-surface dimension of the gap formed in between it and the inclined face contracts in the direction heading toward the bracket 12, i.e., with further separation from the thrust bearing section 26 constituting undersurface of the upper wall portion 2a of the rotor hub 2.

The oil retained in the bearing clearances forms a boundary surface with air and is held within the tapered gap formed in between the inclined face provided on the outer peripheral surface of the sleeve 8 and the inclined face provided on the inner peripheral surface of the ring-shaped member 32, and whose inter-surface dimension gradually expands heading toward the bracket 12. This means that a taper seal area 34 is configured by a functional association between the inner peripheral surface of the ring-shaped member 32 and the outer peripheral surface of the sleeve 8. Only in this taper seal area 34 does the oil retained in the above-described clearances meet the air, in an interface where the surface tension of the oil and atmospheric pressure balance, forming the oil-air interface into a meniscus.

The taper seal area 34 serves as an oil reserve whereby according to the amount of oil retained within the taper seal area 34, the position where the interface forms can shift to suit. This means that oil retained within the taper seal area 34 is supplied to the bearing clearances in response to a decrease in oil retention volume, and that oil that has increased volumetrically owing to thermal expansion or other causes is accommodated within the taper seal area 34.

A communicating hole 36 is formed in the sleeve 8, axially penetrating it to communicate the region radially inward of the thrust bearing section 26, and the region radially beyond the flange-shaped portion 20a of the pin member 20. Oil continuous with the oil retained within the series of the bearing clearances as described above is retained within the communicating hole 36. Likewise, the internal pressure of the oil held within the communicating hole 36 is in balance with the internal pressure of the oil held in each bearing clearances.

In a situation in which the micro-gap formed in between the sleeve 8 inner circumferential surface and the shaft 4 outer circumferential surface, wherein the upper and lower thrust bearing section 22 and 24 are constituted, sustains a predetermined dimension, the oil retained in each bearing clearances will be at least equal in pressure to that generated in the thrust bearing section 26, meaning that the internal pressure of the oil will not become negative-pressured. Nevertheless, if due to error processing the inner circumferential surface of the sleeve 8 and the outer circumferential surface of the shaft 4, the micro-gap formed in between the sleeve 8 inner circumferential surface and the shaft 4 outer circumferential surface is made wider along the axial upper end than along the lower end, the dynamic pressure generated on the lower radial bearing section 24 side will exceed the dynamic pressure generated in the upper radial bearing section 22, producing in the oil a flow heading from the lower to the upper side in the axial direction. This would be a concern lest the internal pressure of the oil retained along the sleeve 8 and the cover member 10—i.e., depth-ward in the bearing gap-become negative-pressured. By the same token, should the micro-gap formed in between the inner circumferential surface of the sleeve 8 and the outer circumferential surface of the shaft 4 be made narrower along the axial upper end than along the lower end, the dynamic pressure generated in the herringbone grooves 22a provided in the upper radial bearing section 22 would become greater than the predetermined pressure, flowing oil from along the upper-edge area to along the lower-edge area in the axial direction. This would be a concern lest the internal pressure of the oil retained surrounding the pin member 20 be elevated more than necessary and produce excessive lift on the rotor 6. Notwithstanding these concerns, since an imbalance in the internal pressure of the oil retained within the bearing clearances occurs occasions a flow of oil through the communicating hole 36 from the side where the pressure is higher to the side where it is lower, resolves the state of internal imbalance. Inasmuch as equilibrium in oil pressure through the communicating hole 36 is designed for, generation of air bubbles and production of excessive lift on the rotor 6 due to negative pressure is prevented; meanwhile, inasmuch as the tolerance range for processing errors is markedly broadened, yields are improved.

It will be appreciated that arranging the communicating hole 36 so that one end opens radially inward of the thrust bearing section 26 makes it so that the oil pressure is kept constant within a region of pressure higher than atmospheric pressure. In this way, the bearing sections deeper inward than the thrust bearing section 26 are put by the thrust bearing section 26 into a sealed condition pressure-wise. Were for example the one end of the communicating hole 36 open in between a bearing section and a taper seal area, as long as the predetermined dynamic pressure is generated in the bearing section, such as when motor rotation is steady, sufficient supporting stiffness would be produced, and the likelihood that knocking or grazing in the bearing section would arise would therefore be low. If, however, the motor rotational speed should drop, such as when the motor is halted, inasmuch as the one end of the communicating hole 36 would open into an area apart from the region sealed pressure-wise—i.e. into a region where the oil pressure would be equal to or otherwise below atmospheric pressure—the oil pressure that within the bearing section had been sustained high would drop abruptly, on account of the pressure difference with the oil pressure in the area where the communicating hole 36 opens. By the pressure within the bearing section thus dropping abruptly, the rotor 6 would be prone to wobbling or running eccentrically, meaning that knocking and grazing between parts such as the shaft 4 and the sleeve 8 that constitute the bearing section would arise. While conceivable causes for this include weight imbalance in the rotor 6 incorporating the recording disk carried by the rotor hub 2, processing and assembly tolerances in the parts composing the motor, or imbalance in magnetic force acting in between the stator 16 and the rotor magnet 18, with such knocking and grazing in the bearing section reoccurring every time the motor is halted, the striking wear and tear on the parts composing the bearing sections would degrade the motor reliability and durability.

To address these issues, by having the communicating hole 36 open radially inward of the thrust bearing section 26, the pumping by the spiral grooves 26a that induces radially-inward-acting fluid dynamic pressure in the oil will operate until just before the motor comes to a complete halt. Since the thrust bearing section 26 thus functions as a partition wall pressure-wise, pressure drop within the bearing sections is eased, and knocking an grazing of the parts that make up the bearing sections is moderated, which holds degradation in motor reliability and durability in check.

Figure 3:
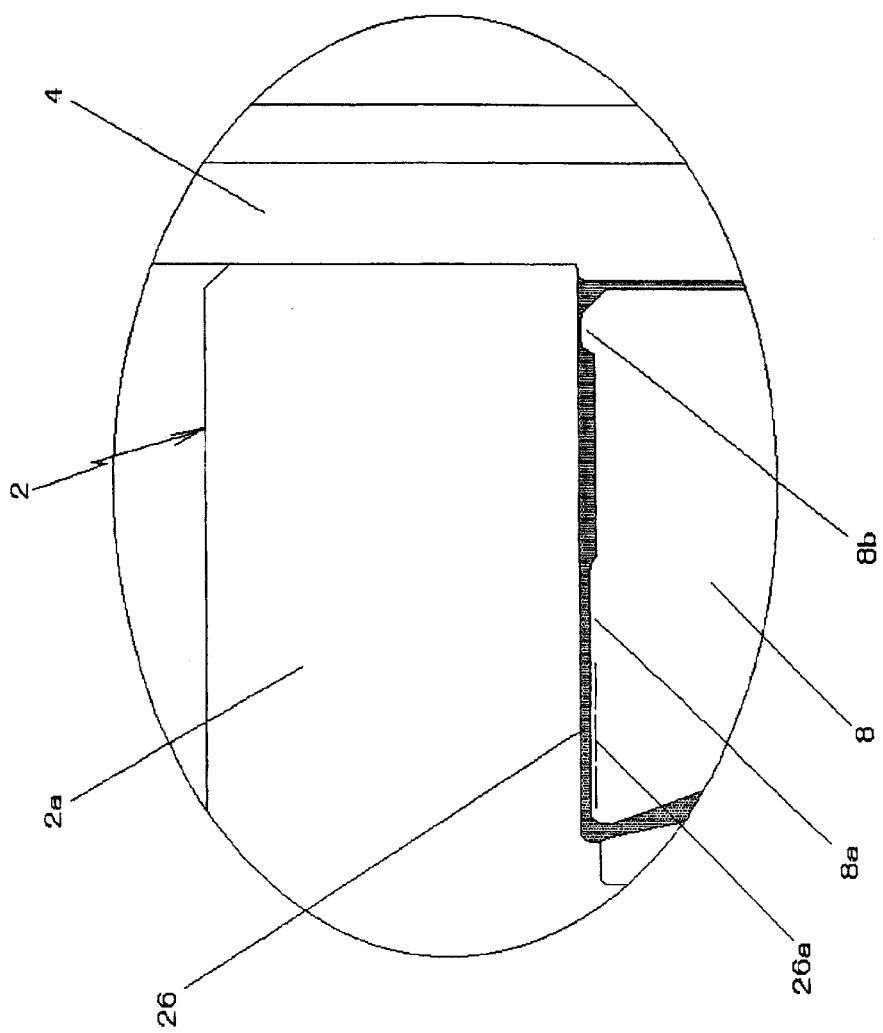
FIG. 3 is an enlarged sectional view that schematically illustrate a portion of the thrust bearing in the spindle motor illustrated in FIG. 2.

With reference to FIG. 3 explanation concerning detail structures around the thrust bearing section 26 of the spindle motor illustrated in FIG. 2 will be made.

As illustrated in FIG. 3, an annular bump 8a is formed on the sleeve 8 upper end face at radially outward portion thereof and the spiral grooves 26a of the thrust bearing section 26 are disposed on the surface of the bump 8a. In addition, an annular protruding portion 8b, which axially projects toward the under surface of the upper wall portion 2a, is formed on the sleeve 8 upper end face at radially inward portion, specifically adjacent to the opening of the communicating hole 36 on the thrust bearing section 26 side. A tip portion of the annular protruding portion 8b is closer to the under surface of the upper wall portion 2a than the bump 8a. Therefore, when the motor is stationary and not rotated, contact portion of the rotor hub 2 and the sleeve 8 is limited only at the tip portion of the annular protruding portion 8b and an opposed portion of the under surface of the upper wall portion 2a, which in turn, contact on the sleeve 8 and the rotor hub 2 draws near line contact from field contact. Consequently, when the motor starts to rotate, the frictional torque and/or loss caused by being in contact with the rotor hub 2 and the sleeve 8 will accordingly be reduced. It is therefore, the starting of the motor is accurately performed, and notwithstanding the spindle motor is miniature and slimed.

Figure 4:
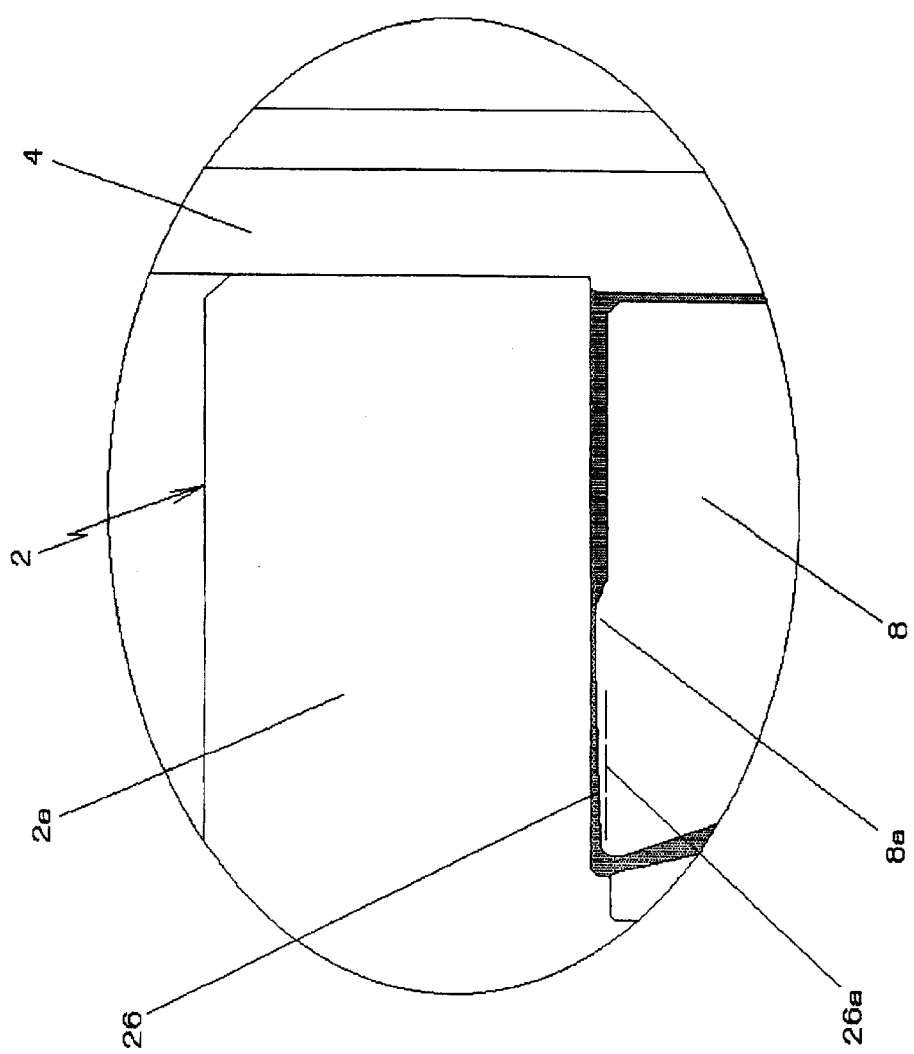
FIG. 4 is an enlarged sectional view that schematically illustrate modified examples of the annular protruding portion.
Figure 5:
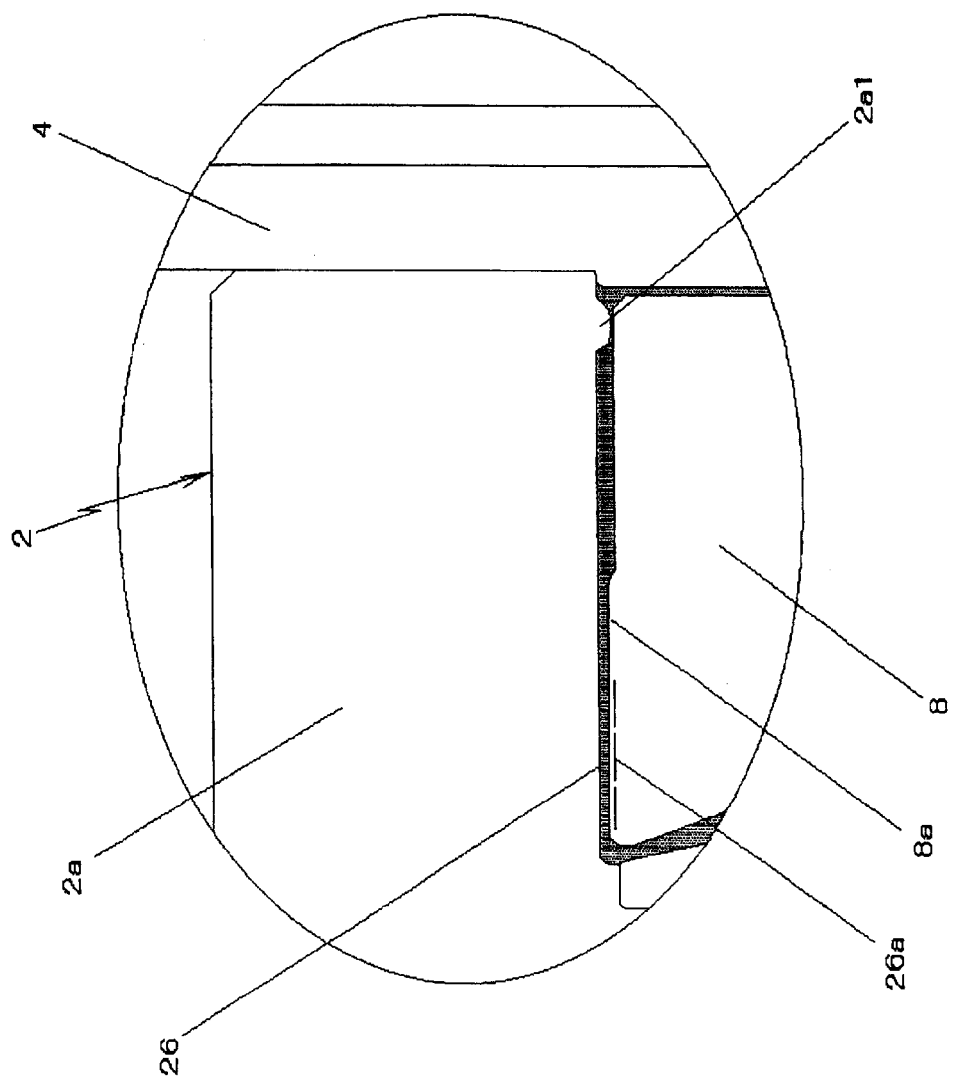
FIG. 5 is an enlarged sectional view that schematically illustrate another modified examples of the annular protruding portion.
Figure 6:
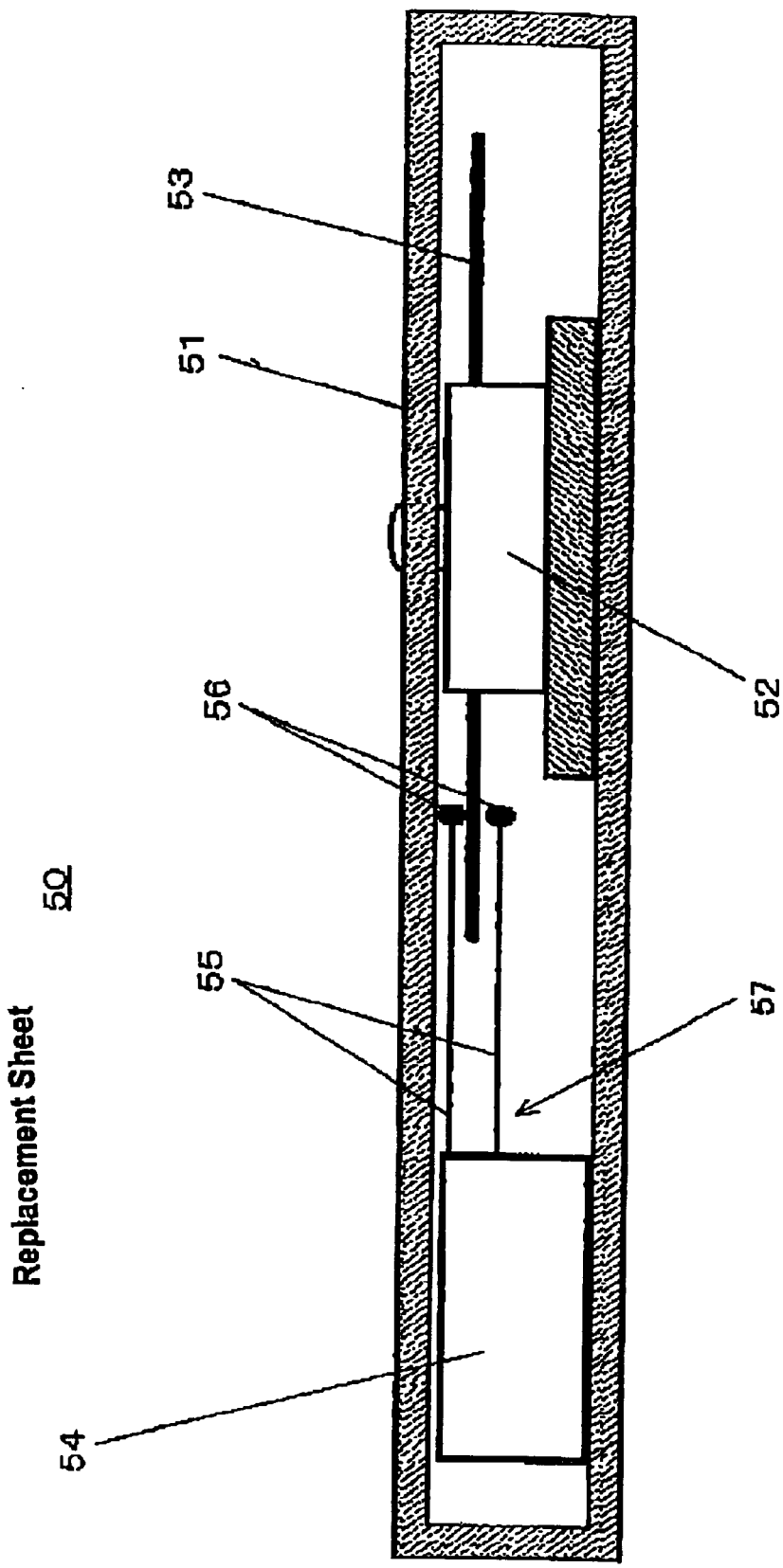
FIG. 6 is a sectional view schematically illustrating the internal configuration of a disk drive.

Further, as illustrated in FIG. 4, instead of the annular protruding portion 8b, the bump 8a may be formed in an inclined configuration such that the inter-surface dimension of the gap formed in between the under surface of the upper wall portion 2a and the inclined face of the bump 8a contracts in the direction toward the shaft 4 so as to be radially inward edge portion of the bump 8b closer to the under surface of the upper wall portion 2a than radially outward portion thereof. This means that a tip portion at radially inward edge portion of the bump 8a is in contact with the under surface of the upper wall portion 2a. Thus, when the motor is stationary and not rotated, contact portion of the rotor hub 2 and the sleeve 8 is limited only at the tip portion of the bump 8a and an opposed portion of the under surface of the upper wall portion 2a. Also, as illustrated in FIG. 5, instead of the annular protruding portion 8b, stepped portion 2a1, which axially projects toward the sleeve 8 upper end face, may be formed at radially inward portion of the under surface of the upper wall portion 2a.

In addition pump-in spiral grooves (not illustrated) that induce radially inward-heading (toward the shaft 4) pressure in the oil when the rotor 6 spins may be formed on the surface of the annular projection 8b and the stepped portion 2a1 similar to the thrust bearing section 26. If the spiral grooves are formed on the surface of the annular projection 8b and the stepped portion 2a1, the spiral grooves of the annular projection 8b and the stepped portion 2a1 serve as auxiliary grooves of the spiral grooves 26a of the thrust bearing section 26.

(2) Disk-Drive Configuration

The internal configuration of a general disk-drive device 50 is represented in a schematic view in FIG. 8. A clean space where dust and debris are extremely slight is formed inside a housing 51, in the interior of which is installed a spindle motor 52 on which platter-shaped disk 53 for recording information are fitted. In addition, a head-shifting mechanism 57 that reads information from and writes information onto the disk 53 is disposed within the housing 51. The head-shifting mechanism 57 is constituted by: heads 56 that read/write information on the disk 53; arms 55 that support the heads 56; and an actuator 54 that shifts the heads 56 and arms 55 over the requisite locations on the disk 53.

Utilizing a spindle motor of the foregoing embodiments as the spindle motor 52 for the disk drive 50 as such enables the disk drive 50 to be made low-profile and reduced-cost, and at the same time improves the stability, reliability and endurance of the spindle motor to render a more highly reliable disk drive. In addition, the disk drive 50 can be stabilized starting the rotation of recording disk 53 notwithstanding the spindle motor 52 is miniature and slimed.

While single embodiments in accordance with the present invention of a spindle motor and a disk drive equipped therewith have been explained in the foregoing, the present invention is not limited to such embodiments. Various changes and modifications are possible without departing from the scope of the invention.

What is claimed is:

1. A spindle motor comprising:
    a shaft;
    a unilaterally open-ended cylindrical bearing member having a bearing hole into which said shaft is inserted and a closed-end surface axially opposing the inserted-end face of said shaft;
    a rotor that rotates together with said shaft and has a circular flat face extending radially outward from the circumferential surface of said shaft;
    a series of bearing clearances filled with oil, formed in between said bearing member, said shaft, and the flat face of said rotor;
    a thrust bearing section provided with dynamic-pressure-generating grooves contoured to impart on the oil pressure acting radially inward during rotation of said rotor, and formed in between the end face along the open end of said bearing member and the flat face of said rotor;
    a radial bearing section provided with dynamic-pressure-generating grooves contoured to impart on the oil pressure acting inward from either end axially during rotation of said rotor, and formed in between the inner peripheral surface of said bearing hole and the circumferential surface of said shaft;
    a communicating passage formed in said bearing member so that one end of said communicating passage opens on said thrust bearing section radially inwardly therein and so that either axial end of a one of said bearing clearances being formed in between the inner peripheral surface of said bearing hole and the circumferential surface of said shaft communicative through said passage, for balancing pressure within said bearing clearances; and
    an annular protruding portion being formed on at least one of the end face of the bearing member and the flat face of the rotor at a radially inward portion of the thrust bearing section.

2. A spindle motor as set forth in claim 1, wherein the annular protruding portion is formed on the end face of the bearing member.

3. A spindle motor as set forth in claim 1, wherein the annular protruding portion is formed on the flat face of the rotor.

4. A spindle motor as set forth in claim 1, wherein an annular bump is formed on the end face of the bearing member at a radially outward portion thereof and the dynamic-pressure-generating grooves of the thrust bearing section are disposed on the surface of the bump, the bump has an inclined configuration such that an inter-surface dimension of a gap formed in between the flat face of the rotor and the inclined face of the bump contracts in the direction toward the shaft so as to be radially inward an edge portion of the bump closer to the flat face of the rotor.

5. A disk drive in which is mounted a disk-shaped recording medium onto which information is recordable, the disk drive including a housing; a spindle motor fixed within said housing, for spinning the recording medium; and an information accessing means for writing information into and reading information from requisite locations on said recording medium; the disk drive characterized in that said spindle motor comprises:
    a shaft;
    a unilaterally open-ended cylindrical bearing member having a bearing hole into which said shaft is inserted and a closed-end surface axially opposing the inserted-end face of said shaft;
    a rotor that rotates together with said shaft and has a circular flat face extending radially outward from the circumferential surface of said shaft;
    a series of bearing clearances filled with oil, formed in between said bearing member, said shaft, and the flat face of said rotor;
    a thrust bearing section provided with dynamic-pressure-generating grooves contoured to impart on the oil pressure acting radially inward during rotation of said rotor, and formed in between the end face along the open end of said bearing member and the flat face of said rotor;
    a radial bearing section provided with dynamic-pressure-generating grooves contoured to impart on the oil pressure acting inward from either end axially during rotation of said rotor, and formed in between the inner peripheral surface of said bearing hole and the circumferential surface of said shaft; and
    a communicating passage formed in said bearing member so that one end of said communicating passage opens on said thrust bearing section radially inwardly therein and so that either axial end of a one of said bearing clearances being formed in between the inner peripheral surface of said bearing hole and the circumferential surface of said shaft communicate through said passage, for balancing pressure within said bearing clearances; and
    an annular protruding portion being formed on at least one of the end face of the bearing member and the flat face of the rotor at a radially inward portion of the thrust bearing section.

6. A disk drive as set forth in claim 1, wherein the annular protruding portion is formed on the end face of the bearing member.

7. A disk drive as set forth in claim 1, wherein the annular protruding portion is formed on the flat face of the rotor.

8. A disk drive as set forth in claim 1, wherein an annular bump is formed on the end face of the bearing member at a radially outward portion thereof and the dynamic-pressure-generating grooves of the thrust bearing section are disposed on the surface of the bump, the bump has an inclined configuration such that an inter-surface dimension of a gap formed in between the flat face of the rotor and the inclined face of the bump contracts in the direction toward the shaft so as to be radially inward an edge portion of the bump closer to the flat face of the rotor.

* * * * *